United States Patent [19]

Tateiwa et al.

[11] Patent Number: 5,417,886
[45] Date of Patent: May 23, 1995

[54] PHOSPHOR COATING COMPOSITION, AND DISCHARGE LAMP

[75] Inventors: Toshiaki Tateiwa; Kouichi Okada; Tetsuya Sadamoto; Yoshihito Hario, all of Anan, Japan

[73] Assignee: Nichia Kagaku Kogyo K.K., Tokushima, Japan

[21] Appl. No.: 123,709

[22] Filed: Sep. 20, 1993

Related U.S. Application Data

[63] Continuation of Ser. No. 767,820, Sep. 30, 1991, abandoned.

[30] Foreign Application Priority Data

Oct. 2, 1990 [JP] Japan ................. 2-266077

[51] Int. Cl.⁶ .............................. C09K 11/02
[52] U.S. Cl. ................. 252/301.4 R; 252/301.4 H; 252/301.36; 106/287.27; 106/287.29
[58] Field of Search .............. 252/301.4 R, 301.36, 252/301.4 H; 427/64, 67; 428/403; 106/287.27, 287.29

[56] References Cited

U.S. PATENT DOCUMENTS

| | | | |
|---|---|---|---|
| 3,607,371 | 9/1971 | Haynes et al. | 427/64 |
| 4,088,802 | 5/1978 | Shriver | 427/67 |
| 4,131,821 | 12/1978 | Mossman | 313/398 |
| 4,459,507 | 7/1984 | Flaherty | 204/192.15 |
| 4,710,674 | 12/1987 | Sigai | 427/67 |
| 4,890,033 | 12/1989 | Ichinomiya et al. | 313/487 |
| 4,952,422 | 8/1990 | Pappalardo et al. | 427/67 |

FOREIGN PATENT DOCUMENTS

| | | |
|---|---|---|
| 45-7438 | 3/1970 | Japan . |
| 55-146447 | 11/1980 | Japan . |
| 56-047479 | 4/1981 | Japan . |
| 59-129286 | 7/1984 | Japan . |
| 2082618 | 3/1982 | United Kingdom . |

Primary Examiner—Mark L. Bell
Assistant Examiner—C. M. Bonner
Attorney, Agent, or Firm—Nixon & Vanderhye

[57] ABSTRACT

A phosphor-coating composition contains phosphor particles, particles of a rare earth compound, a binder, and a dispersing medium. The rare earth compound is present in an amount of 0.001 to 5% by weight in terms of the corresponding oxide.

9 Claims, No Drawings

PHOSPHOR COATING COMPOSITION, AND DISCHARGE LAMP

This is a continuation of application Ser. No. 07/767,820, filed Sep. 30, 1991, now abandoned.

BACKGROUND OF THE INVENTION

1. Field of the Invention

The present invention relates, in a broad sense, to a technical field of phosphors other than silicate phosphors. More specifically, it relates to a phosphor-coating composition based on such phosphors, and a discharge lamp using the same.

Silicate phosphors, no matter when used singly or in combination, comprised mainly of silicate (50% by weight or more), whereas the present invention relates to a phosphor whose major component is other than silicate (i.e., even when the silicate phosphor is present, its content is less than 50% by weight). Hereinafter, such phosphors containing silicate phosphors, if present, in an amount of less than 50% by weight will be referred to simply as phosphors.

2. Description of the Related Art

Phosphors have been commonly utilized for a discharge lamp, for instance, a fluorescent lamp. They have been used not only singly, but also in mixture. Such a mixture includes as a so-called three-component type phosphor composition containing a red luminous phosphor, a blue luminous phosphor and a green luminous phosphor. Recently, even a five-component type phosphor composition having an improved color rendering property has been commercially available. To reiterate, phosphors of the type used in the invention are clearly distinguished in terms of the major component from silicate phosphors whose major component is silicate.

In general, a discharge lamp, e.g., a fluorescent lamp is prepared in such a manner that phosphors are suspended in a highly viscous solution (vehicle) prepared by dissolving a binder in a solvent, to prepare a phosphor suspension (phosphor-coating liquid). The phosphor-coating liquid is coated on an inner wall of a bulb, and the coated material is baked, obtaining a fluorescent lamp. The phosphor-coating liquid may be roughly classified into two types depending on the kind of the solvent used: one is organic type using an organic solvent and the other is aqueous type using water as a solvent.

Meanwhile, in order to prevent the phosphor layer from peeling off the inner wall of the bulb, an adhesive material is usually used together. Such an adhesive material may be added to the phosphor-coating liquid, or alternatively may be previously attached to the surfaces of phosphor particles.

As adhesive materials added to the phosphor-coating liquid, there are known alkaline earth borates such as calcium barium borate, calcium pyrophosphate, and aluminum oxide. There are also known a first glass prepared from calcium pyrophosphate and calcium tetraborate, and a water-resistant glass composition having a low melting point, expressed by $Ln_2O_3$—MnO—$B_2O_3$, where Ln is Y or a lanthanoid, M is Mg, Ca, Sr, Ba, and/or Zn).

These conventional adhesive materials, however, often can not produce desired adhesive effects unless they are added in a relatively large amount (e.g., at least 2% by weight or more) relative to the phosphor to be coated on the inner wall of the bulb. Further, they tend to lower not only the initial luminous flux of the fluorescent lamp, but also the luminous flux maintenance of the phosphor layer during lightening.

SUMMARY OF THE INVENTION

It is therefore an object of the present invention to provide a phosphor-coating composition containing an adhesive material which can suppress a lowering of the initial luminous flux as well as luminous flux maintenance of a discharge lamp, and exhibit a sufficient adhesive strength even in a small amount, as well as a discharge lamp prepared using the phosphor-coating composition.

According to the present invention, there is provided a phosphor-coating composition comprising phosphor particles, at least one binder, particles of at least one rare earth compound in amount of 0.001 to 5% by weight in terms of the corresponding rare earth oxide, based on the weight of the phosphor particles, and a medium which does not dissolve the rare earth compound.

A discharge lamp of the invention is obtained by applying a phosphor-coating composition according to the invention to an inner wall of a bulb, and baking the applied composition.

DETAILED DESCRIPTION OF THE PREFERRED EMBODIMENTS

The present invention will now be described in more detail.

The present inventors have studied on adhesive materials to be present in a phosphor layer, and have found that by using, as an adhesive material, a rare earth compound, in the form of fine particles, in a phosphor-coating liquid, and applying the resultant composition to the inner wall of a bulb as a layer, a phosphor layer having improved luminous flux characteristics can be obtained.

In the present invention, the rare earth compound is used in an amount of 0.001 to 5 parts by weight in terms of the corresponding oxide, $R_2O_3$, where R represents a rare earth element, based on 100 parts by weight of the phosphor particles (i.e., 0.001 to 5% by weight in terms of, or calculated as, the corresponding rare earth oxide, based on the weight of the phosphor particles). Preferably, the rare earth compound is used in an amount of 0.2 to 1.5% by weight in terms of, or calculated as, the corresponding rare earth oxide, based on the weight of the phosphors.

Rare earth compounds are compounds of a rare earth element which is a generic name for those elements belonging to Group IIIA of the Periodic Table, i.e., scandium, yttrium, and lanthanoids (15 elements).

The rare earth elements particularly useful in the invention include scandium (Sc), yttrium (Y), lanthanum (La), samarium (Sm), europium (Eu), gadolinium (Gd), dysprosium (Dy), holmium (Ho), thulium (Tm) and lutetium (Lu). Particularly preferred are yttrium and lanthanum.

The rare earth compounds used in the present invention may be used in the form of an oxide, or may be a precursor of the oxide, which can ultimately be converted into the corresponding oxidic compounds, including oxides, in a baking step, which will be explained later, or in the forming step, including forming the bulb into a circular shape. It is desirable that the rare earth compounds are white in color so as to well reflect light. The rare earth compound which can be converted into the corresponding oxide during baking, etc., includes hydroxides; inorganic acid salts such as nitrates, sulfates, borates, phosphates; halides such as chlorides and bromides; and organic acid salts such as acetates. Examples of the rare earth compound preferably used in the invention are yttrium oxide, lanthanum oxide, yttrium hydroxide, lanthanum hydroxide, yttrium nitrate, lanthanum nitrate, yttrium chloride, lanthanum chloride, dysprosium chloride, yttrium acetate, and lanthanum acetate. Among these, the oxides, and hydroxides are particularly suitable.

In the present invention, the rare earth compounds can be applied to the surface of phosphor particles, and then a phosphor-coating liquid can be prepared using the resultant phosphor particles. Alternatively, a phosphor-coating liquid may be directly prepared. In any case, the rare earth compound of the invention is present in the form of fine particles. The rare earth compound used in the invention has an average particle diameter of, usually, 0.1 to 1 $\mu$m.

The rare earth compound of the invention can increase an adhesive strength between the phosphor particles, and between the phosphor particles and a glass bulb, even in a small amount, unlike the conventional adhesive materials.

Further, the rare earth-based adhesive material of the invention uniformly adhere to, or cover, the surfaces of phosphor particles. Therefore, it can suppress the deterioration of the phosphors caused by sputtering, adsorption of mercury and a mercury ray of 184.5 nm wavelength, etc., during the lightening of the discharge lamp, leading to a remarkably improved luminous flux maintenance of the lamp.

The present invention is applicable to any phosphors other than silicate-based phosphors described previously. Examples of the phosphors used in the invention include, in addition to those used in Examples described below, halophosphate phosphors such as $3Ca_3(PO_4)_2Ca(F, Cl)_2:Sb^{3+}$, $3Ca_3(PO_4)_2Ca(F, Cl)_2:Sb^{3+}$, $Mn^{2+}$, $(Ba, Ca, Mg)_{10}(PO_4)_6Cl_2:Eu^{2+}$; phosphate phosphors such as $Sr_2P_2O_7:Sn^{2+}$, $LaPO_4:Ce^{3+}$, $Tb^{3+}$; tungstate phosphors such as $CaWO_4$, $CaWO_4:Pb^{2+}$; aluminate phosphors such as $BaMg_2Al_{16}O_{27}:Eu^{2+}$, $SrMgAl_{10}O_{17}:Eu2+$; and rare earth phosphors such as $Y_2O_3:Eu^{3+}$; and $6MgOAs_2O_5:Mn^{2+}$, etc. The present invention is applicable not only to the single phosphors, but also to a mixture of the phosphors, e.g., multi-component type mixed phosphors such as three-component type phosphor containing a blue luminous phosphor $(Ba, Ca, Mg)_{10}(PO_4)_6Cl_2:Eu^{2+}$, a green luminous phosphor $LaPO_4:Ce^{3+}$, $Tb^{3+}$, and a red luminous phosphor $Y_2O_3:Eu^{3+}$. Usually, phosphors have an average particle diameter of from 3 to 8 $\mu$m, and those of 5 to 6 $\mu$m are often used.

Meanwhile, in order to obtain a discharge lamp in accordance with the present invention, a phosphor-coating liquid is prepared, in which the phosphor particles and the rare earth compound particles are dispersed, and the coating liquid is coated on the inner wall of the bulb (usually, a glass bulb), followed by baking. Note that the rare earth compound of the invention is not doped into the phosphor.

The phosphor-coating liquid of the invention contains a binder, usually organic in nature, in addition to the phosphor particles and rare earth compound. The binder is used to adjust the viscosity of the coating liquid so as to attain an easy application of the coating liquid. The binder is added in an amount sufficient to obtain the viscosity of the coating liquid of, usually, about 20 to 60 centipoises.

The binder used in the invention is dissolved in a phosphor-dispersing medium or solvent (organic solvent, or water). For a phosphor-coating liquid using an organic solvent such as butyl acetate or xylene, a cellulosic binder such as nitrocellulose or ethylcellulose can be used. For an aqueous phosphor-coating liquid, a water-soluble binder can be used, including polyethyleneoxide (PEO), water-soluble cellulose compounds (for example, hydroxyethylated cellulose, hydroxypropylated cellulose, carboxymethylcellulose), and water-soluble polyacrylates (for example, polymethyl methacrylate).

Usually, the phosphor-coating liquid of the invention contains about 30 to 70% by weight of the weight of the medium. The coating liquid may further contain a surface active agent and/or a defoaming agent as in the conventional coating liquid.

In order to prepare the aqueous phosphor-coating liquid, phosphor particles coated with the rare earth compound are prepared, which are mixed with a solution of a binder in a solvent. The rare earth compound-coated phosphor particles can be prepared by adding phosphor particles to a suspension dispersing fine particles of the rare earth compound in a dispersing medium, and sufficiently mixing the resultant suspension, followed by drying. Alternatively, the rare earth-coated phosphor particles may be prepared spraying the suspension of the fine particles of the rare earth compound noted above to the phosphor particles, followed by drying.

A second way of preparing the phosphor-coating liquid of the invention involves sufficiently mixing the phosphor particles with the binder solution, to which mixture phosphor particles are added.

Further, an auxiliary adhesive material may be added to the phosphor-coating liquid of the invention, if a further improvement in the adhesive strength of the phosphor layer to the inner wall of the bulb is desired, as in a case where a circular-tube discharge lamp is produced. The auxiliary adhesive material includes fine particles of aluminum oxide and/or alkaline earth borates. These auxiliary adhesive material does not affect of the invention, and may sometimes enhance the effect of the invention. Usually, the auxiliary adhesive material can be used in an amount of from 0.001 to 5% by weight relative to the weight of the phosphors.

The thus prepared phosphor-coating liquid as described above is applied to the inner wall of the glass bulb in a conventional manner, and is baked. The baking may be carried out at a temperature up to 700° C., usually from 450 to 600° C. The baking time may be about 5 to 20 minutes. During baking, the binder contained in the phosphor layer will be removed. At this time, the rare earth compound, other than oxide, is converted into the corresponding oxidic compound. The converted oxidic compound of the rare earth element includes the rare earth oxide, and also a composite oxide formed as a result of dehydration of the rare earth hydroxide during the baking, of which structure can not be yet defined clearly.

The thickness of the phosphor layer after baking is usually about 15 to 25 $\mu$m.

The subsequent steps for the manufacture of a lamp may be carried out in a conventional manner. Thus, after the phosphor layer is formed on the bulb inner wall as described above, the bulb is formed into a circular shape (forming temperature: around 800° C.), if desired. Then, the bulb is evacuated, and a rare gas is sealed, together with mercury, in the bulb, to whose both ends caps or heads are attached, obtaining a desired lamp. The structure itself of a discharge lamp, e.g., a fluorescent lamp of the invention is substantially the same as the conventional one, and includes well-known straight-tube and circular-tube structures.

As has been explained above, according to the present invention, a discharge lamp having an improved luminous flux maintenance can be produced relatively in a simple way.

The present invention will be described below by way of its examples. In the examples, the adhesive strength of the phosphor layer of a fluorescent lamp was measured by the so-called pneumatic peeling test, described below, and the results are indicated by a peel-off diameter.

Pneumatic Peeling Test

Air under a predetermined pressure (usually, 0.8 kg/cm$^2$) is blown from a nozzle arranged at predetermined distance and having a predetermined diameter (usually, 2 mm) against the inner wall of the glass bulb removed of the headers, for a predetermined period of time, and the peel-off hole having the maximum diameter made in the phosphor layer, caused by the peeling-off of a part of the phosphor layer, is measured as a peel-off diameter. The peel-off diameter is a measure for evaluating the adhesive strength: the larger the peel-off diameter, the weaker the adhesive strength.

EXAMPLE 1

100 g of particles of calcium halophosphate phosphor, and 100 g of 1% solution of nitrocellulose in butyl acetate which contained fine particles of lanthanum oxide suspended therein in an amount of 1% by weight relative to the weight of the phosphor particles, were mixed to prepare a phosphor-coating liquid.

The phosphor-coating liquid was applied to the inner wall of a straight-tube glass bulb for 40 WSS fluorescent lamp, and was baked in an electric furnace at 450° C. for 15 minutes, followed by cooling, to obtain a glass bulb having the phosphor layer of 20 μm thickness. Then, the glass bulb was evacuated, charged with a rare gas together with mercury and was attached by headers at both ends, preparing a straight-tube 40 WSS fluorescent lamp.

For comparison, various kinds of phosphor-coating liquids were prepared as in Example 1, except that the fine particles of lanthanum oxide were not used (Comparative Example 1); colloidal alumina was used, in an amount of 1% by weight of the phosphor, instead of lanthanum oxide (Comparative Example 2); and calcium pyrophosphate was used in an amount of 2% by weight of the phosphor, instead of lanthanum oxide (Comparative Example 3), respectively. Then, fluorescent lamps were prepared respectively using thus prepared phosphor-coating liquids, as in Example 1.

These fluorescent lamps were respectively measured on their adhesive strength of the phosphor layer by the pneumatic peeling test, to obtain a peel-off diameter of about 10 mm for the lamp of Example 1, and that of about 32 mm for those of Comparative Examples 2 and 3.

After 500-hour lightening of the lamp, the lamp of Example 1 showed a luminous flux maintenance of approx. 94.8% with a lowering of only about 5% from the initial luminous flux, whereas the lamp of Comparative Example 1 showed a luminous flux maintenance of about 92% with a lowering of about 8% from the initial luminous flux. The lamps of Comparative Examples 2 and 3 showed those of approx. 87% for the former and approx. 89% for the latter, with a lowering of about 13% and 11% respectively. Thus, the lamp of Example 1 (the invention) has achieved an improvement in the luminous flux maintenance of approx. 6–8% relative to the lamps of Comparative Examples 2 and 3.

EXAMPLE 2

A phosphor-coating liquid was prepared using, instead of the nitrocellulose solution suspending lanthanum oxide, 1% solution of nitrocellulose in butyl acetate suspending fine particles of lanthanum hydroxide in an amount of 0.5% by weight in terms of lanthanum oxide, based on the weight of the phosphor, in the same manner as in Example 1. Then, a fluorescent lamp was prepared using this phosphor-coating liquid, as in Example 1.

The adhesive strength of the phosphor layer of this lamp was as high as that of Example 1. The luminous flux maintenance after 500-hour lightening was as superior as 96.8%.

EXAMPLE 3

10 kg of wet powder of calcium halophosphate powder prepared according to the conventional method, by mixing the phosphor raw materials, baking, grinding and washing with water, were transferred in a transfer pipe by hot air stream, during which 10% dysprosium oxide suspension suspending fine particles of dysprosium oxide (average particle diameter of 0.5 μm) in an amount of 0.5% by weight relative to the phosphor, was sprayed through a nozzle onto the phosphor powder. The treated phosphors were collected by means of a back filter, obtaining dry phosphors coated with fine particles of dysprosium oxide.

10 100 g of the dry treated phosphor particles were mixed with 100 g of 1% solution of nitrocellulose in butyl acetate to prepare a phosphor-coating liquid. Using the phosphor-coating liquid, a fluorescent lamp was prepared as in Example 1.

The lamp prepared as above showed a slightly stronger adhesive strength of the phosphor layer than that of Example 1, and an excellent luminous flux maintenance of 93.8% after 500-hour lightening.

EXAMPLE 4

100 g of calcium halophosphate phosphor were mixed with 80 g of 0.5% solution of polyethyleneoxide in water which suspended fine particles of lanthanum oxide an amount of 1% by weight relative to the weight of the phosphor. To this mixture, aqueous ammonia was added to raise the pH value to 9.0, to obtain a phosphor-coating liquid.

A fluorescent lamp was prepared using the phosphor-coating liquid prepared above, as in Example 1, except that the baking was conducted at a temperature of 580° C. for 15 minutes.

The lamp has an adhesive strength of the phosphor layer as high as that of Example 1, and an excellent luminous flux maintenance of 94.5% after 500-hour lightening.

EXAMPLE 5

90 g of mixed phosphor consisting of divalent europium-activated strontium calcium barium chlorophosphate phosphor as a blue luminous component, cerium and terbium-activated lanthanum orthophosphate phosphor as a green luminous component, and trivalent europium-activated yttrium oxide phosphor as a red luminous component, were mixed with 100 g of 0.7% solution of polyethyleneoxide in water suspending fine particles of lanthanum oxide in an amount of 1% by weight relative to the mixed phosphor. To this mixture, aqueous ammonia was added to raise the pH value to 9.0, to obtain a phosphor-coating liquid.

Using the phosphor-coating liquid above, a fluorescent lamp was prepared as in Example 4.

For comparison, a phosphor-coating liquid was prepared by mixing 90 g of the mixed phosphor as used in Example 5 with 100 g of 0.7% solution of polyethyleneoxide in water suspending fine particles of aluminum oxide in an amount of 1% by weight relative to the mixed phosphor. Using this phosphor-coating liquid, a fluorescent lamp was prepared as above (Comparative Example 4).

The fluorescent lamp of the Comparative Example 4 showed the initial luminous flux of 3480 (lm), whereas the lamp of Example 5 showed the initial luminous flux of 3515 (lm). Regarding the luminous flux maintenance after 1000-hour lightening, the former, Comparative Example 4, was 93% with a lowering of about 7% from the initial luminous flux, whereas the latter, Example 5, was 96% with a lowering of only 4%. Concerning the adhesive strength of the phosphor layer of the fluorescent lamp measured by the pneumatic peeling test, the peel-off diameter of the former was 27 mm, whereas that of the latter was only 12 mm, which means a 2 times or more higher strength than the former.

EXAMPLE 6

A phosphor-coating liquid was prepared in the same way as in Example 5, except that 1% solution of nitrocellulose in butyl acetate suspending fine particles of lanthanum hydroxide in an amount of 1% by weight relative to the phosphor was used, instead of the 0.7% solution of polyethyleneoxide containing fine particles of lanthanum oxide suspended therein. Using this phosphor-coating liquid, a fluorescent lamp was prepared as in Example 5.

For comparison, the fluorescent lamp was prepared, using 1% nitrocellulose solution in butyl acetate containing mixed fine particles of calcium pyrophosphate and calcium barium borate in a ratio of 1:1, with the mixed particles being suspended in an amount of 1% by weight relative to the phosphor (Comparative Example 5).

The fluorescent lamp of the Comparative Example 5 showed the initial luminous flux of 3552 (lm), whereas the lamp of Example 6 showed that of 3581 (lm). Concerning the luminous flux maintenance after 1000-hour lightening, the former, the Comparative Example 5, was 94.2% with a lowering of approx. 6% from the initial luminous flux, whereas the latter, Example 6, was 96.8% with a lowering of only 3%. Regarding the adhesive strength of the phosphor layer of the fluorescent lamp measured by pneumatic peeling test, the peel-off diameter of the former was 22 mm, whereas that of the latter was only 13 mm.

What is claimed is:

1. A phosphor-coating composition for a fluorescent lamp, which is ready to be coated on an inner surface of the lamp, said composition comprising:

halophosphate phosphor particles;

an adhesive material consisting of fine particles, having an average diameter of 0.1 to 1.0 $\mu$m, of an oxide or hydroxide of lanthanum and/or yttrium in an amount of 0.001 to 5% by weight in terms of lanthanum and/or yttrium oxide, based on the weight of the phosphor particles;

a binder; and a medium dissolving the binder and dispersing the halophosphate phosphor particles and the adhesive material therein, wherein said adhesive material increase the adhesive strength between the phosphor particles themselves and between the phosphor particles and the inner surface of the lamp.

2. The composition according to claim 1, wherein said adhesive material is present in an amount of 0.2 to 1.5% by weight in terms of lanthanum and/or yttrium oxide, based on the weight of said phosphor particles.

3. The composition according to claim 1 or 2, wherein said adhesive material consists of fine particles of lanthanum oxide.

4. The composition according to claim 1 or 2, wherein said adhesive material consists of fine particles of lanthanum hydroxide.

5. The composition according to claim 1 or 2, wherein said adhesive material consists of fine particle of yttrium oxide.

6. The composition according to claim 1, wherein said medium comprises water.

7. The composition according to claim 6, wherein said binder comprises polyethylene oxide.

8. The composition according to claim 1 or 2, wherein said binder is present in an amount sufficient to provide a viscosity of about 20 to 60 centipoises to the composition.

9. A phosphor-coating composition for a fluorescent lamp, which is ready to be coated on an inner surface of the lamp, said composition comprising:

halophosphate phosphor particles;

an adhesive material consisting of fine particles, having an average diameter of 0.1 to 1.0 $\mu$m, of an oxide or hydroxide of lanthanum in an amount of 0.2 to 1.5% by weight in terms of lanthanum oxide, based on the weight of the phosphor particles;

a binder comprising polyethylene oxide; and a medium comprising water, said medium dissolving the binder and dispersing the halophosphate phosphor particles and the adhesive material therein, wherein said adhesive material increases the adhesive strength between the phosphor particles themselves and between the phosphor particles and the inner surface of the lamp.

* * * * *